Patented Dec. 24, 1940

2,225,704

UNITED STATES PATENT OFFICE 2,225,704

LUMINESCENT MATERIAL

Alfred Hamilton McKeag, North Wembley, England, assignor to General Electric Company, a corporation of New York No Drawing. Application October 25, 1939, Serial No. 301,297. In Great Britain October 25, 1938

3 Claims. (Cl. 250—81)

My invention relates to luminescent materials of the type comprising a luminescent tungstate, and more particularly calcium, magnesium, zinc, or magnesium-cadmium tungstate, and to discharge lamps in which such materials are present within the envelope.

One object of my invention is to provide a luminescent tungstate material characterized by a marked reduction in the discoloration to which such tungstates are liable, especially when exposed to a mercury vapor discharge.

Another object of my invention is to conveniently reduce the discoloration to which luminescent tungstates are subject by the addition of a compound which is relatively stable in air.

A feature of the invention is the addition of a suitable carbonate to luminescent tungstates to thereby effect a reduction in the discoloration of such tungstates.

Several proposals have been made recently to mix intimately with luminescent tungstates a suitable proportion (generally of the order of 10 per cent by weight) of the oxides of certain bivalent metals. One of the most important advantages said to be attained by such admixture is a reduction or abolition of the discoloration to which tungstates are liable, especially when they are exposed to a discharge through mercury vapor in a discharge lamp.

It has now been found that most, if not all, of this advantage can still be obtained if these oxides are replaced by suitable carbonates. If carbonates are equally efficient, they are often more convenient, because they are more stable in air. It is not necessary that the metal of the carbonate be bivalent. The only conditions that appear to be essential are that the carbonate should be $a$ not easily soluble in water, and $b$ white, and $c$ sufficiently stable to be easily dried, and $d$ stable in the conditions to which they are exposed in a discharge tube. Condition $d$ does not imply that there must be no decomposition of the carbonate during the baking and exhausting of a discharge tube in which it is contained, inasmuch as calcium carbonate, which is one of the preferred materials, probably does not fulfill that condition. But evolution of gas during exhausting must either be so slow as not to interfere with the exhausting, or must be so rapid as to be complete during the normal period of exhausting. The second alternative is much less likely than the first. Furthermore, no substantial decomposition of the carbonate must occur during the normal operation of the completed tube.

According to the invention a luminescent material of the type specified comprises a carbonate, whose weight is not less than 0.25 per cent of the weight of the tungstate, mixed intimately with the tungstate, the said carbonate being one that has all the aforesaid properties $a$, $b$, $c$, $d$, whereby the luminescent material is less subject to discoloration, when used in a discharge tube, than if the said carbonate were absent.

There are not many carbonates (apart from those impracticably expensive) that fulfill these conditions. Of the bivalent carbonates, those of Be, Mg, Ca, Sr, Ba, and Zn have all proved satisfactory. It is not necessary that the metal of the carbonate be the same as that of the tungstate with which it is mixed. Of other carbonates, those of Li, Pb and Th have been found occasionally satisfactory. It is not always true that the carbonate most satisfactory with one tungstate is most satisfactory with another, or indeed, that a carbonate satisfactory with one tungstate is necessarily satisfactory with another. It would therefore be a tedious matter, even if it were possible, to prove that any given carbonate is always unsatisfactory. Moreover, since the effect in reducing discoloration is one of degree, it is impossible to draw a sharp line between what is satisfactory and unsatisfactory.

The following table gives the results that have been definitely established. The three vertical columns at the right of the table are headed by the metals of the three tungstates on which systematic experiments have been made; the horizontal rows are headed by the metals of the carbonates that have been mixed with them. The symbol ++ indicates a marked reduction in discoloration; + indicates an appreciable, but not so marked, reduction; 0 indicates that no reduction could be established with certainty; and a blank indicates that the experiment has not been tried. It will be seen that the experiments indicate that the carbonates of Ba, Sr and Ca are generally preferable.

| Carbonates | Tungstates | | |
|---|---|---|---|
| | Magnesium | Calcium | Cadmium |
| Li | + | + | |
| Be | 0 | + | |
| Mg | + | + | |
| Ca | ++ | ++ | + |
| Zn | + | ++ | |
| Sr | ++ | ++ | + |
| Ba | ++ | ++ | |
| Pb | + | 0 | |
| Th | + | 0 | |

In these experiments the weight of the carbonate was usually 5 per cent of that of the tungstate; but sometimes it was 10 or 15 per cent. An upper limit to the amount of carbonate that is desirable, usually about 20 per cent, is set by the loss of efficiency due to dilution of the tungstate. The lower limit, below which the carbonate produces no appreciable effect, is higher when the material is to be coated on glass tubing afterwards bent by heat than when it is not to be exposed to such drastic treatment. It is generally desirable that the weight of the carbonate should be not less than 2 per cent of that of the tungstate.

The methods by which the tungstate and carbonate may be mixed are also very similar to those already known for the oxides. The mixture may be effected in the presence of enough liquid to form a paste, or by stirring the fine dry powders together. It is not necessary to heat the mixed material except so as to dry it, if liquid has been added.

The effects of the carbonates appear to be additive, so that any combination of carbonates, each satisfactory, may be mixed with the same tungstate.

What I claim as new and desire to secure by Letters Patent of the United States is:

1. A luminescent material comprising a luminescent tungstate intimately admixed with a white carbonate which is substantially insoluble in water, sufficiently stable to be readily dried, and stable under the conditions to which said luminescent material is exposed in a mercury vapor discharge device, the proportion by weight of said carbonate being in excess of 0.25 per cent and not greater than about 20 per cent of the weight of said tungstate, said carbonate serving to minimize discoloration of said luminescent material.

2. A luminescent material comprising a luminescent tungstate intimately admixed with at least one compound included within the group consisting of the carbonates of beryllium, magnesium, calcium, strontium, barium, zinc, lithium, lead and thorium, the proportion by weight of said carbonate being in excess of 0.25 per cent and not greater than about 20 per cent of the weight of said tungstate, said carbonate serving to minimize discoloration of said luminescent material.

3. A luminescent material comprising a luminescent tungstate intimately admixed with at least one compound included within the group consisting of the carbonates of barium, strontium and calcium, the proportion by weight of said carbonate being in excess of 0.25 per cent and not greater than about 20 per cent of the weight of said tungstate, said carbonate serving to minimize discoloration of said luminescent material.

ALFRED HAMILTON McKEAG.